United States Patent [19]

Kai

[11] Patent Number: 5,049,736
[45] Date of Patent: Sep. 17, 1991

[54] APPARATUS FOR MEASUREMENT OF GEOLOGICAL AGE BY MEASURING ZIRCONIUM COLOR

[75] Inventor: Kunio Kai, Kawasaki, Japan

[73] Assignee: Sekiyushigen Kaihatsu Kabushiki Kaisha, Tokyo, Japan

[21] Appl. No.: 565,719

[22] Filed: Aug. 13, 1990

[30] Foreign Application Priority Data

Sep. 19, 1989 [JP] Japan ................................. 1-240639

[51] Int. Cl.$^5$ .......................... G01J 3/50; H01J 5/16; H01J 40/14
[52] U.S. Cl. ..................................... 250/226; 356/30; 356/402
[58] Field of Search .................. 250/226, 225; 356/30, 356/402

[56] References Cited

U.S. PATENT DOCUMENTS

| | | | |
|---|---|---|---|
| 3,944,368 | 3/1976 | Beesley | 356/30 |
| 3,947,120 | 3/1976 | Bar-Issac et al. | 356/30 |
| 4,461,568 | 7/1984 | Welbourn et al. | 356/30 |
| 4,527,895 | 7/1985 | Rubin | 356/30 |
| 4,906,083 | 3/1990 | Sattler | 356/30 |

Primary Examiner—David C. Nelms
Assistant Examiner—John R. Lee
Attorney, Agent, or Firm—George B. Oujevolk; Joseph C. Mason, Jr.; Ronald E. Smith

[57] ABSTRACT

A geological age measurement apparatus by the color measurement of zirconium comprises an arithmetic recording computer including a recording medium input/output unit medium connected to both a measured result storage medium and a control storage medium including a calibration curve preparation program showing the relation between the color of zirconium and its geological age, an age arithmetic program for calculating the geological age from the color and a basic program. The apparatus allows the evaluation of geological age by color measurement easily, promptly and inexpensively without using any large expensive instruments. The evaluation of geothermal heat storage layers and heat source is done almost spontaneously while geothermal walls are being bored for their tests.

3 Claims, 8 Drawing Sheets

— FLOW OF ELECTRIC SIGNALS
--- FLOW OF LIGHT AND/OR OPTICAL IMAGE
⇐ INSTALLATION OF STORAGE MEDIUM
= CONNECTION OF MACHINE PARTS

APPARATUS FOR MEASUREMENT OF GEOLOGICAL AGE BY MEASURING ZIRCONIUM COLOR

BACKGROUND OF THE INVENTION

1. Field of the Invention

This invention relates to an apparatus for measuring both the formation stages of geothermal heat storage layers for evaluating thermal head development areas and the geological ages of volcanic rocks by measuring the absorption spectrum characteristics of the zirconium included in the volcanic rocks by means of a colorimeter for the samples of new volcanic rocks from geological viewpoints.

2. Description of the Prior Art

Zirconium is a mineral as one of the by-constituents widely contained in volcanic rocks and its color as well as its crystal habits varies in various ways. It is known that the colors of zirconium vary with the respective geological ages.

Up to this time, the geological ages of volcanic rocks have been evaluated by means of radioisotope contrast measurement with a mass spectrometer and fission track method by counting the track of spontaneous fission fragments. However, the colorimeter for measuring the absorption spectrum characteristics of zirconium is commercially available, but there is no available zirconium color measurement apparatus equipped with the age measurement calibration curve of the relation between the colors of zirconium and its corresponding geological ages.

In case of the conventional colorimeters, they are not equipped with the calibration curve which shows the relation between the colors of zirconium and its geological ages, and therefore, the measurements of geological ages cannot be done by them. In addition, the conventional measurement method for ages necessitates some expensive large instruments such as mass spectrometer and nuclear reactor and further the special technique for handling large analyzing instruments. Furthermore, it takes a long time to pretreat and measure samples and as a result, it takes many days to get the measured results for geological ages.

SUMMARY OF THE INVENTION

A primary object of the present invention is to be able not only to carry out color measurement for the evaluation of geological ages, and but also to measure extremely easily and promptly geological ages without requiring any chemical information and any particular techniques for measurement.

Another object of the present invention is to evaluate geological ages at small expenses without the use of some expensive large instruments such as a mass spectrometer and nuclear reactor.

A further object of the present invention is to carry out the evaluation of geothermal heat storage layers and heat source almost spontaneously while geothermal walls are being bored, since the measurement of geological ages is carried out very promptly.

Briefly, an apparatus for the measurement of geological age by the color measurement of zirconium according to the present invention comprises a polarizing objective lens or the like for obtaining the magnified images of samples, a slit device for stopping the quantity of light, a lens-barrel including an optical path switching lever and an eyepiece, a photoelectric transducer device for converting light into electric signals, a light source device placed in the inclined upper direction from an object sample bearer, connected to a voltage stabilizer device and equipped with a polarizing condenser lens, a color measuring instrument for converting the electric signals transduced by the photoelectric transducer device into their color values and including an input/output control unit, a compensation circuit, a compensation memory circuit connected to the compensation circuit, a color arithmetic circuit and a color display system conversion circuit, the compensation circuit, the color arithmetic circuit and the color display system conversion circuit being connected in series to the input/output control unit, an arithmetic recording computer connected to the output portion of the color measuring unit, an input unit and a display unit and including both a control arithmetic circuit connected to a storage medium input/output unit and the storage medium input/output unit connected to both a measured results storage medium and a control storage medium.

Furthermore, the control storage medium includes a calibration curve preparation program showing the relation between colors and geological ages, an age arithmetic program for calculating the geological ages from colors, and a basic program, and in some cases it may further include a spectro luminous intensity integration program, a control program, a compensation memory program, a color arithmetic program, and a color display system conversion program.

BRIEF DESCRIPTION OF THE DRAWINGS

The other objects and features of the invention will become apparent from the following description of preferred embodiments of the invention with reference to the accompanying drawings, in which:

FIGS. 1 and 2 show a first preferred embodiment of the present invention respectively, in which

FIGS. 4 and 5 show a third preferred embodiment of the present invention respectively, in which

DETAILED DESCRIPTION OF THE PREFERRED EMBODIMENTS

Figure 1:
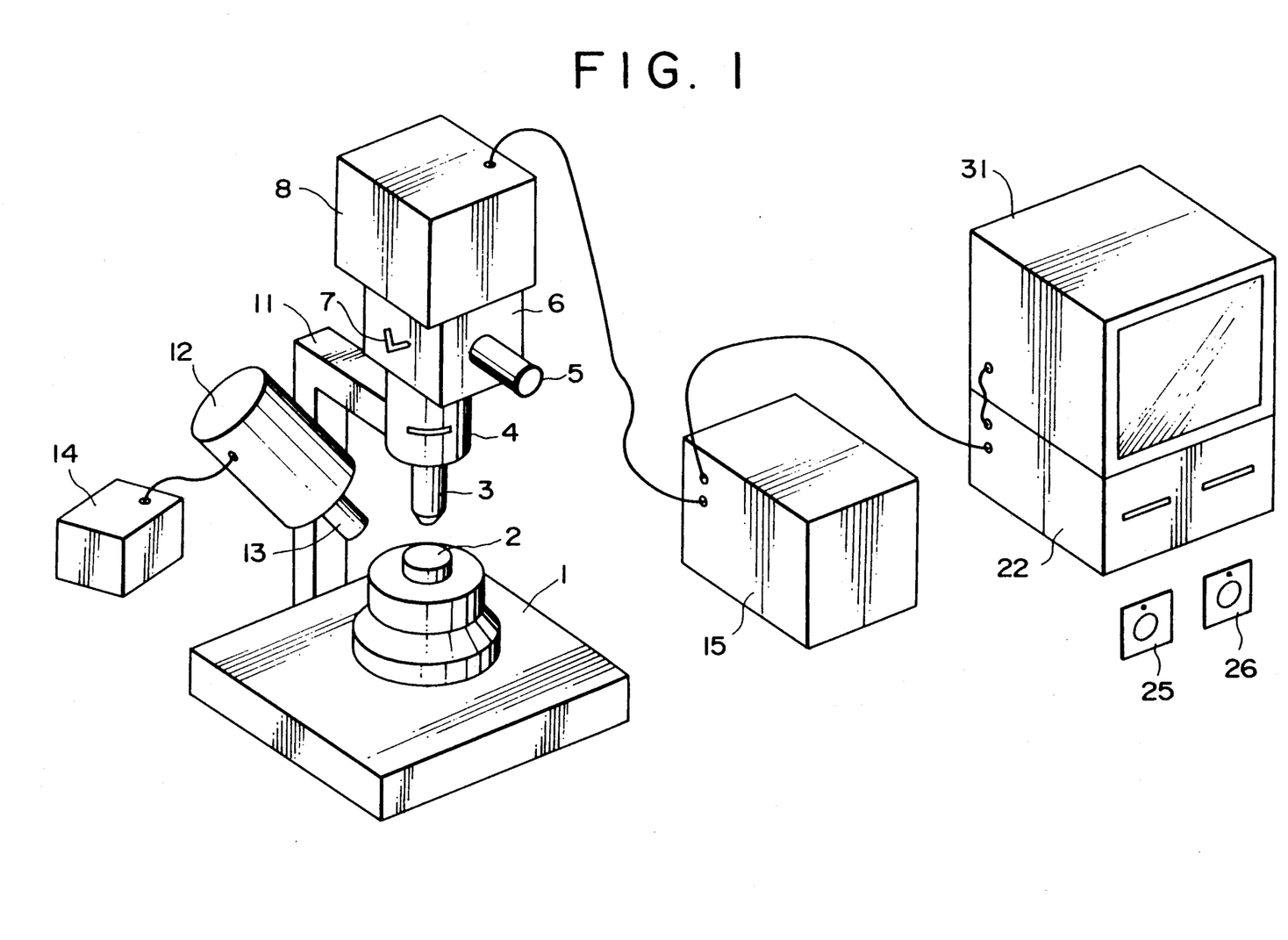
FIG. 1 is a perspective view of a geological age measurement apparatus by the color measurement of zirconium.
Figures 2, 2A:
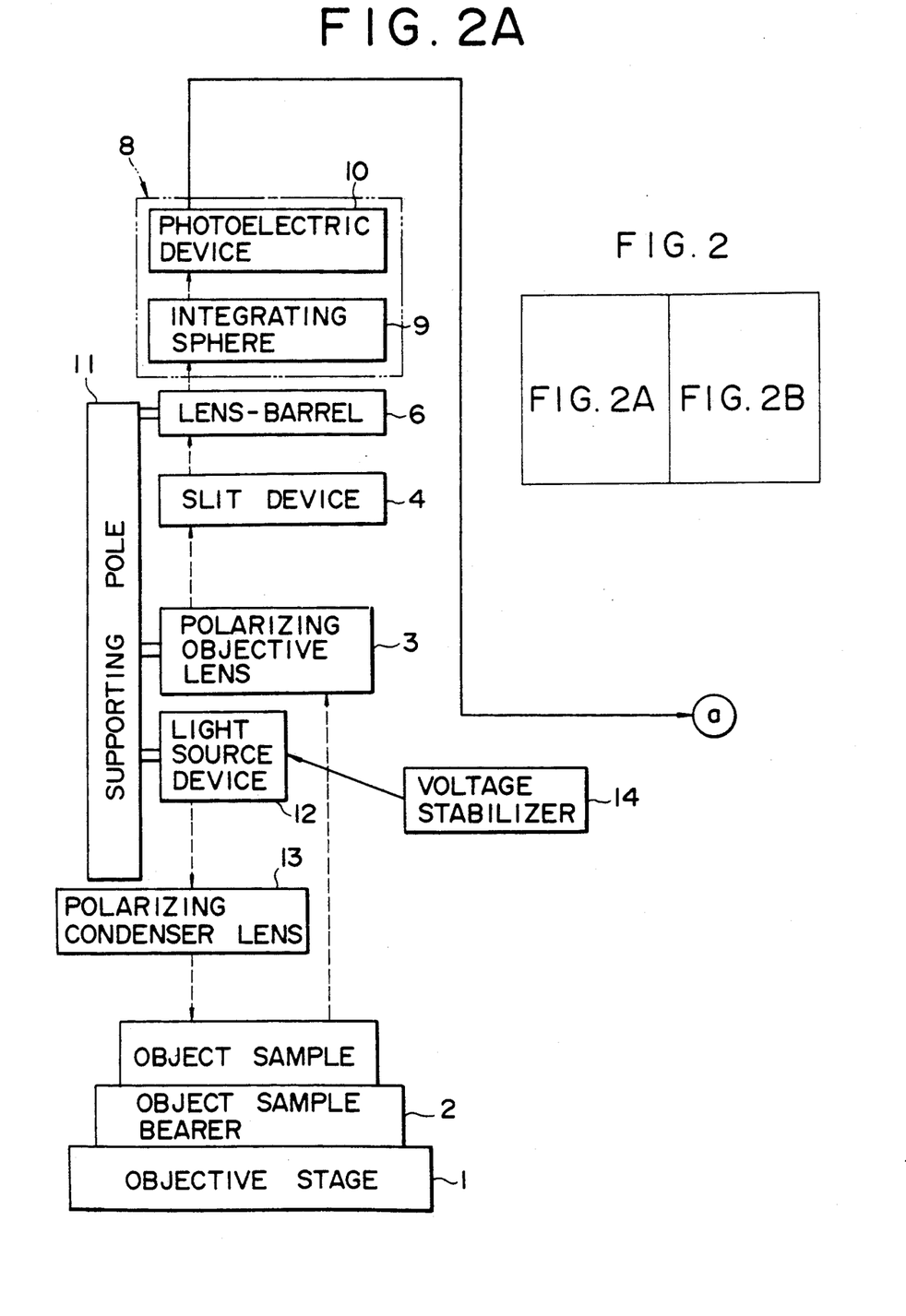
FIG. 2 is a circuit diagram for measurement in the geological age measurement apparatus, the FIG. 2 consisting of FIG. 2A and FIG. 2B which are arranged left and right respectively to give a single flow.

FIGS. 1 and 2 show a first embodiment of the present invention. An object sample bearer 2 is fixed on an objective stage 1, and in the upper portions of the object sample bearer 2, a polarizing objective lens 3 for obtaining enlarged sample images, a slit device 4 having a slit for stopping the quantity of light, a lens-barrel 6 equipped with an optical path-switching lever 7 and an eyepiece 5, and a photoelectric transducer device 8 for converting light into electric signals are arranged in order from the bottom to the upper part. The photoelectric transducer device 8 comprises an integrating sphere 9 placed on the optical path of the lens-barrel 6 and a photoelectric device 10 connected to the sphere 9. A light source device 12 is placed at the inclined upper portion of the object sample bearer 2 and connected to a voltage stabilizer 14 and has a polarizing condenser lens 13. Further, the polarizing objective lens 3, the lens-barrel 6 and the light source device 12 are fixed to a supporting pole. Furthermore, the slit device 4 is connected to both of the polarizing objective lens 3 and the lens-barrel 6, and the photoelectric transducer device 8 is also connected to the lens-barrel 6.

Figure 2B:
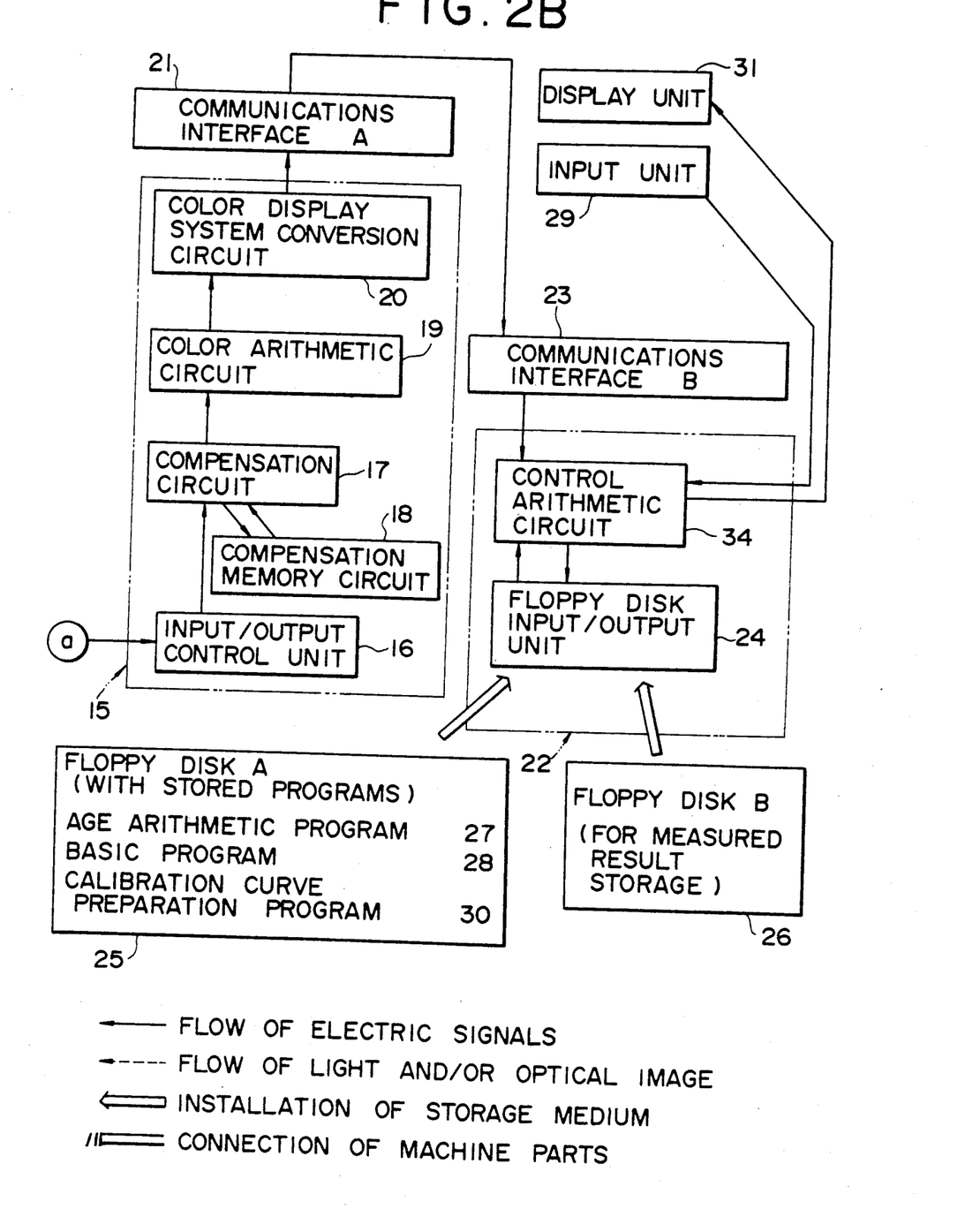

A color measuring instrument 15 for converting and controlling the converted electric signal by the photoelectric transfer device 8 is equipped with an input/output control unit, to which a compensation circuit 17, a color arithmetic circuit 19 and a color display system conversion circuit 20 are by turn connected in series, and a compensation memory circuit 18 connected to the compensation circuit 17. The input portion of the input/output control unit 16 is connected to the output portion of the photoelectric device 10 in the photoelectric transducer device 8. The input electric signal by the starting of the input/output control unit 16 is transferred into an arithmetic recording computer 22 through a communications interface A21 and another communications interface B23.

The input/output control unit 16 controls the input/output of the electric signals transmitted from the photoelectric transducer device 8. The input/output control unit 16 controls input and at same time lets the compensation circuit be output in the compensation memory circuit 18 at the measuring time of a standard white plate, while being output in the compensation circuit 17 at the measurement time of samples.

The arithmetic recording computer 22 includes a storage medium input/output unit 24 comprising a floppy disk input/output unit and a control arithmetic circuit 34 connected to the unit 24. The control arithmetic circuit 34 is connected to an input unit 29 and a display unit 31 comprising a computer television unit or the like. Both of a control storage medium 25 comprising a program stored floppy disk A and a storage medium 26 comprising a floppy disk for the storage of measured results are connected to the storage medium input/output unit 24. A calibration curve preparation program 30 showing the relation between colors and geological ages, an age arithmetic program 27 for computing the corresponding geological age from each color and a basic program 28 are stored in the control storage medium 25. The calibration curve preparation program 30 prepares the calibration curve showing the relation between geological ages and measured color values. The age arithmetic program 27 converts the measured color values into their corresponding values of geological age by using the calibration curve. The basic program 28 controls the processing for recording the measured color values in the storage medium 26 for recording the measured results as data.

Next will be explained the action of the geological age measurement apparatus by the color measurement of zirconium in the first preferred embodiment of the present invention.

First of all, turn the power switch on in each of the voltage stabilizer 14, the color measuring instrument 15, the arithmetic recording computer 22 and the display unit 31, and start the basic program 28 stored in the control storage medium 25 to properly adjust each of the equipments.

Then, place a commercially available white standard sample on the object sample bearer 2, focus on it while observing a magnified image through the eyepiece 5, input the electric signal from the photoelectric device 10 in the compensation memory circuit 18 through the input/output control unit 16 and the compensation circuit 17, and further interrupt the light towards the photoelectric transducer device 8 by the operation of the optical path switching lever 7 for measurement. In this manner, the resulting compensated color values are stored in the compensation memory circuit 18 by the signal transmitted from the compensation circuit 17. Then, remove the white standard sample from the object sample bearer 2.

Then, place an object sample pretreated by a proper method on the object sample bearer 2, focus on its by the eyepiece 5, introduce the resulting light into the photoelectric transducer device 8 by operating the optical path switcting lever 7, and practice the measurement by the input/output control unit 16. In this manner, the measured values are compensated by the compensation circuit 17 using the compensated values stored in the compensation memory circuit 18, then converted into the respective color values by the color arithmetic circuit 19, and further, converted into the color values of various color systems.

The signals of the measured color values are trnsferred to the storage medium input/output unit 24 through the communication interface A21, the communication interface B23 and the control arithmetic circuit 34. The measured color values are stored in the measured result recording storage medium 26 by the operation of the basic program 28 in the control storage medium 25. As for the repeatedly measured data, the average value and the standard deviation of the data are stored in the storage medium 26 by the basic program 28 and the color measurement is completed for one object sample.

By the input unit 29, the measured results stored in the storage medium 26 are read in the storage medium input/output unit 24, and the geological age value is calculated by the age arithmetic program 27 in the control storage medium 25 and through the control arithmetic circuit 34. The calculated value of geological age is stored in the measured result storage medium 26. In addition, in the display unit 31, the observation points of the measured sample are displayed on the calibration curve representing the colors and the geological ages.

In case the measurement is done in this way, it is possible that it takes a short time, approximately ten minuts to measure the geological age for one sample.

Figures 3, 3A:
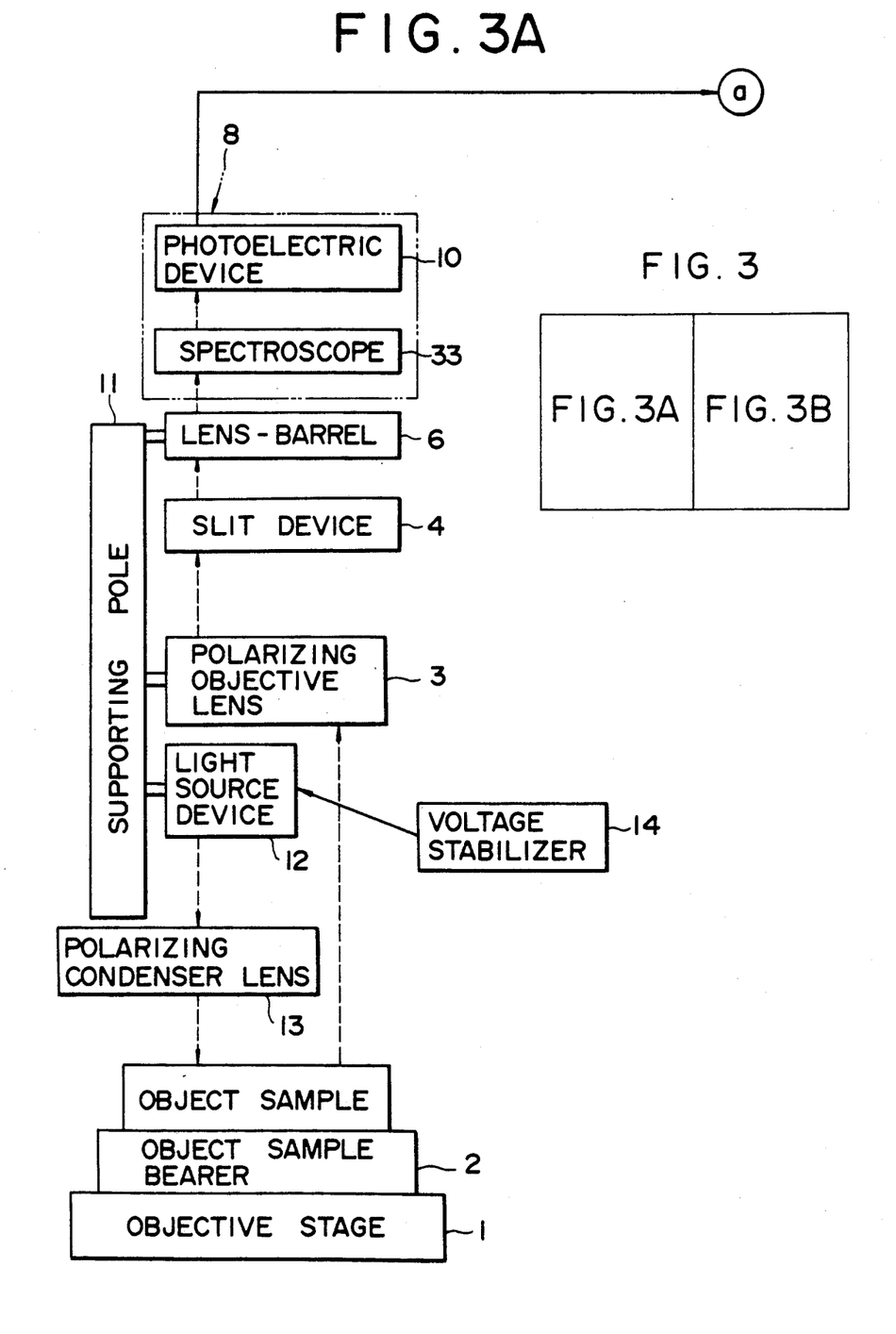
FIG. 3 is a circuit diagram for measurement in the geological age measurement apparatus by the color measurement of zirconium as a second preferred embodiment of the present invention, the FIG. 3 consisting of FIG. 3A and FIG. 3B which are arranged left and right respectively to give a single flow.
Figure 3B:
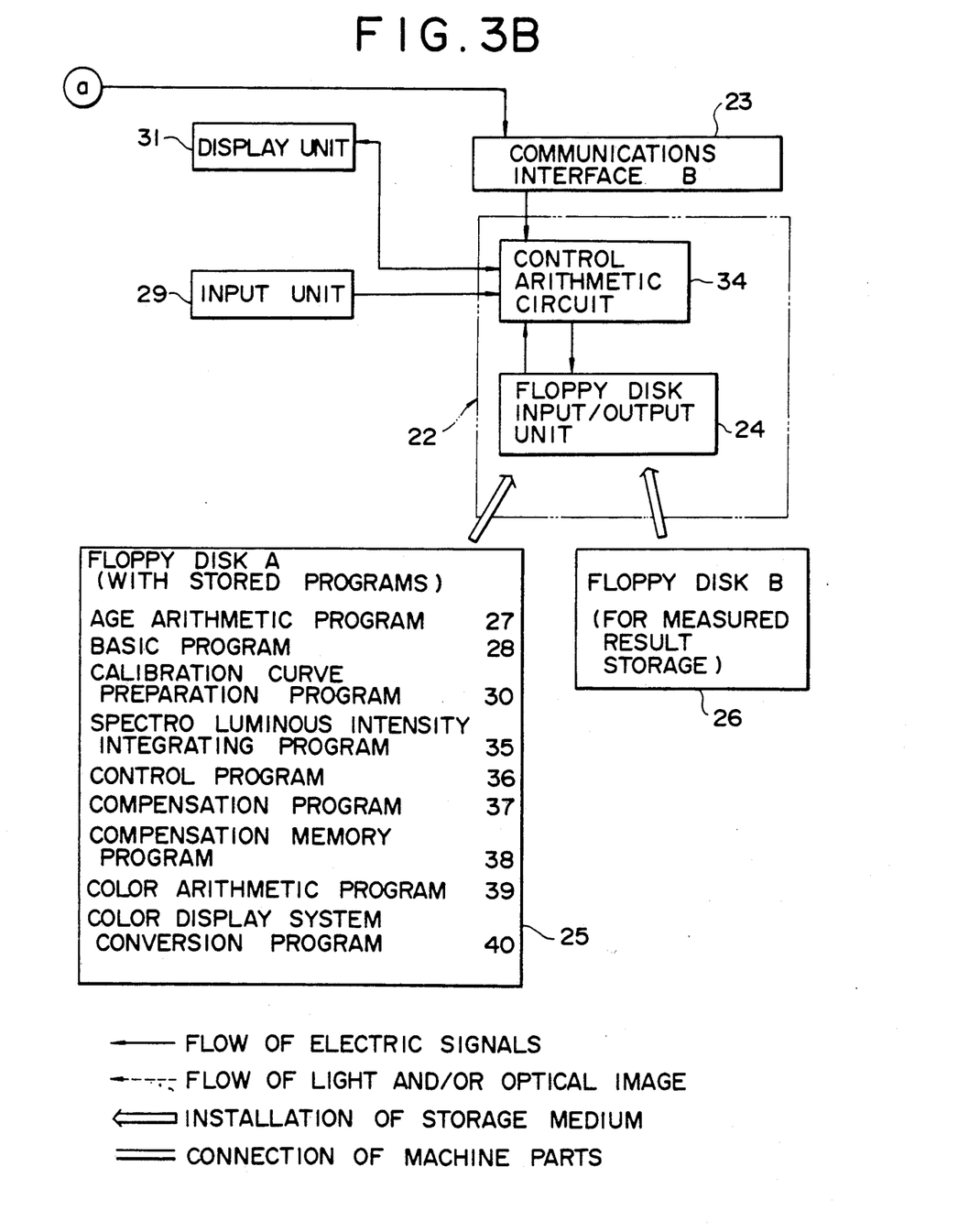

FIG. 3 shows the second embodiment of the present invention. The photoelectric transducer device 8 is used and comprises a spectrometer composed of a spectroscope 33 and the photoelectric device 10. The photoelectric device 10 in the photoelectric transducer device 8 is connected to the control arithmetic circuit 34 in the arithmetic recording computer 22 through the communications interface B23. The control storage medium 25 stores the age arithmetic program 27, the basic program 28, the calibration curve preparation program 30, a spectro luminous intensity integrating program 35, a control program 36 instead of the input/output control unit 16 shown in FIG. 2, a compensation program 37 instead of the compensation circuit 17, a compensation memory program 38 instead of the compensation memory circuit 18, a color arithmetic program 39 instead of the color arithmetic circuit 19, and a color display system conversion program 40 instead of the color display system conversion circuit 20. The other constitution is same with that in case of the first embodiment.

In the second preferred embodiment, the calibration curve preparation program 30 showing the relation between the colors and the geological ages, the age arithmetic program 27 for calculating the geological ages from the colors, the basic program 28, the spectro luminous intensity integrating program 35, the control program 36, the compensation memory program 38, the color arithmetic program 39 and the color display system conversion program 40 are all stored in the arithmetic recording storage medium 25 of the arithmetic recording computer, and as a result, the color measuring instrument 15 for use in the first embodiment is omitted.

Figure 4:
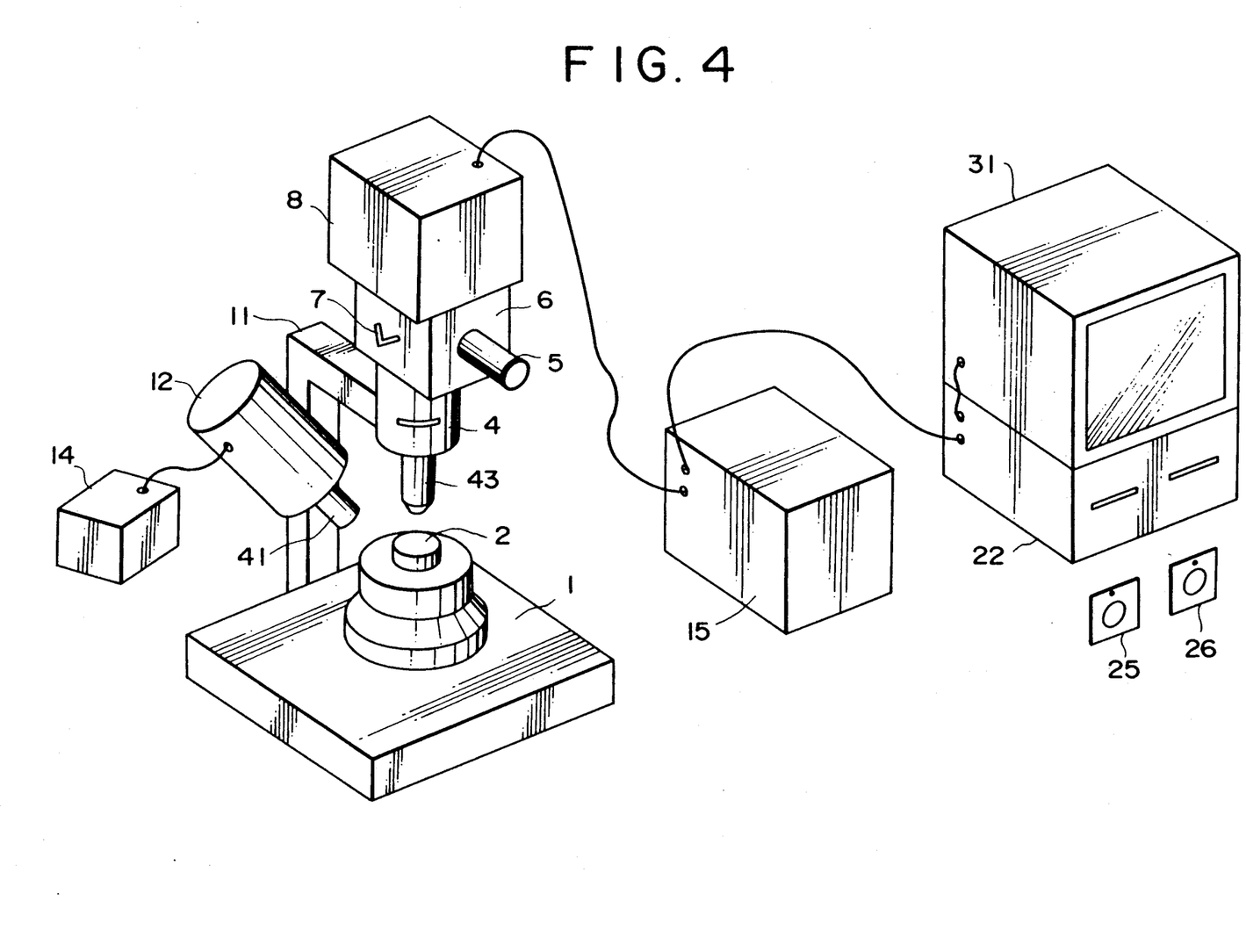
FIG. 4 is a perspective view of the geological age measurement apparatus by the color measurement of zirconium.
Figures 5, 5A:
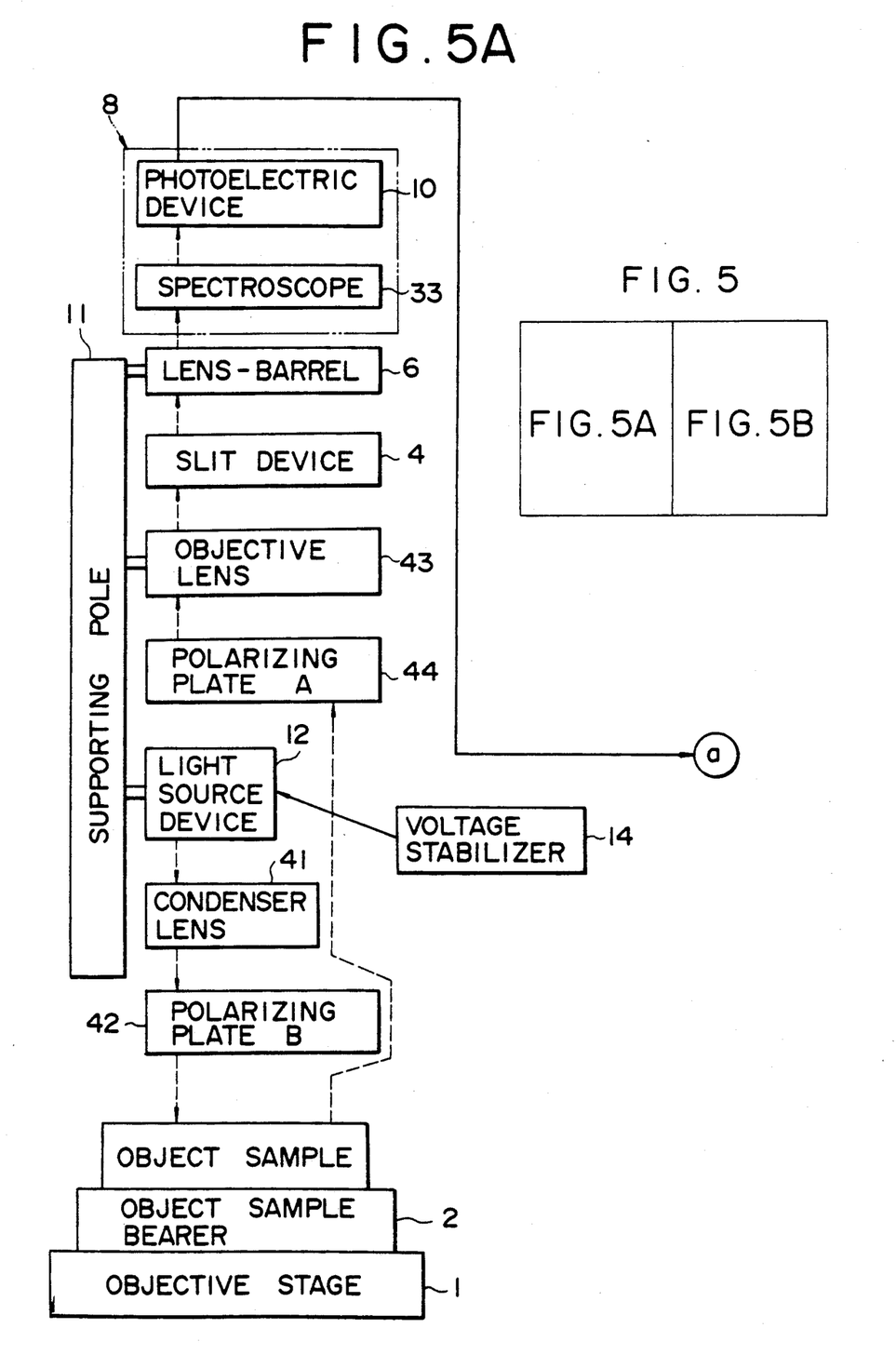
FIG. 5 is a circuit diagram for measurement in the geological age measurement apparatus, the FIG. 5 consisting of FIG. 5A and FIG. 5B which are arranged left and right respectively to give a single flow.
Figure 5B:
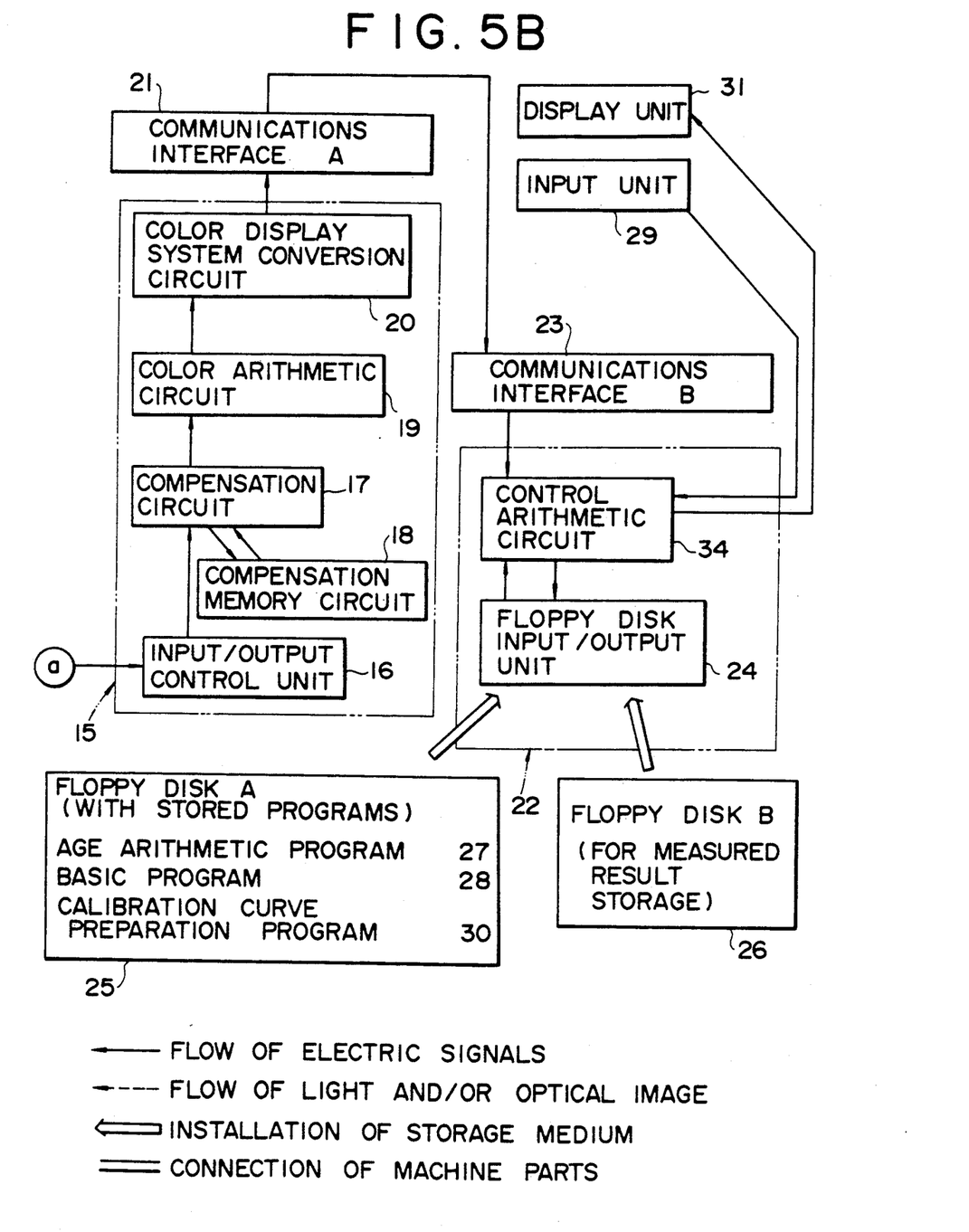

FIGS. 4 and 5 show the third preferred embodiment of the present invention. At the upper position of the object sample bearer 2 fixed to the objective stage 1, an objective lens 43 attached with a polarizing plate 44 for obtaining the magnified images of the samples, the slit device 4 having a slit for stopping the quantity of light, the lens-barrel 6 equipped with the optical path switching lever 7 and the eyepiece 5, and the photoelectric transducer device 8 comprising the spectroscope 33 for converting light into electric signals and the photoelectric device 10 are arranged in order from the lower part to the upper part. The light source device 12 is placed at the inclined upper position of the object sample bearer 2 and connected to the voltage stabilizer 14 and has a polarizing plate 42 and a condenser lens 41. Furthermore, the objective lens 43, the lens-barrel 6 and the light source device 12 are fixed to the supporting pole 11. The slit device 4 is connected to the objective lens 43 and the lens-barrel 6, and at same time the photoelectric transducer device 8 is connected to the lens-barrel 6. The other part of its constitution is same with that in case of the first embodiment.

Summarizing the above-mentioned preferred embodiments of the present invention, in case of the first preferred embodiment of the present invention, the spectrometer comprising the spectroscope 33 and the photoelectric device 10 as shown in the second and third embodiments of the present invention may be used as the photoelectric transducer device 8. In the cases of the second and third embodiments of the present invention, the photoelectric colorimeter comprising the integrating sphere 9 and the photoelectric device 10 as shown in the first preferred embodiment may be use as the photoelectric transducer device 8.

In the cases of the first and second embodiments of the present invention, the combination of the condenser lens 41, the polarizing plate B42, the objective lens 43 and the polarizing plate A44 as shown in the third embodiment of the present invention may be used instead of the polarizing condenser lens 13 and the polarizing objective lens 3.

In practicing the present invention, a fixed disk, an optical disk or a magnetic tape instead of the floppy disk A or B may be used as the storage medium 25 or 26. The object sample bearer 2 may also be placed on the objective stage 1 fixed to the supporting pole 11.

What is claimed is:

1. A geological age measurement apparatus by the color measurement of zirconium, comprising:
   a polarizing objective lens (3) for obtaining magnified images of samples;
   a slit device (4) for stopping the quantity of light;
   a lens-barrel 6 including an optical path switching lever (7) and an eyepiece (5);
   a photoelectric transducer device (8) for converting light into electric signals;
   said polarizing objective lens (3), said slit device (4), said lens-barrel (6) and said photoelectric transducer device (8) being arranged in order from the bottom direction to the top direction above an object sample bearer (2) for placing object samples;
   a light source device (12) placed in the inclined upper direction from said object sample bearer (2), connected to a voltage stabilizer (14) and equipped with a polarizing condenser lens (13);
   a color measuring instrument (15) for converting and controlling the electric signals converted by said photoelectric transducer device (8) into their color values and including an input/output control unit (16), to which a compensation circuit 17, a color arithmetic circuit (19) and a color display system conversion circuit (20) are connected in series, and a compensation memory circuit (18) connected to said compensation circuit (17); and
   an arithmetic recording computer (22) connected to the output portion of said color measuring instrument (15), an input unit (29) and a display unit (31), and including both a control arithmetic circuit (34) connected to a storage medium input/output unit (24) and said storage medium input/output unit 24 connected to both a measured result storage medium (26) and a control storage medium (25) including a calibration curve preparation program (30) showing the relation between colors and geological ages, an age arithmetic program (27) for calculating the geological ages from colors, and a basic program (28).

2. A geological age measurement apparatus by the color measurement of zirconium, comprising:
   a polarizing objective lens (3) for obtaining magnified images of samples;
   a slit device (4) for stopping the quantity of light;
   a lens-barrel 6 including an optical path switching lever (7) and an eyepiece (5);
   a photoelectric transducer device (8) for converting light into electric signals;
   said polarizing objective lens (3), said slit device (4), said lens-barrel (6) and said photoelectric transducer device (8) being arranged in order from the bottom direction to the top direction above an object sample bearer (2) for placing object samples;
   a light source device (12) placed in the inclined upper direction from said object sample bearer (2), connected to a voltage stabilizer (14) and equipped with a polarizing condenser lens (13); and
   an arithmetic recording computer (22) connected to the output portion of said photoelectric transducer device (8), a display unit (31) and an input unit (29), and including both a control arithmetic circuit (34) connected to a storage medium input/output unit (24) and said storage medium input/output unit (24) connected to both a measured result storage medium (26) and a control storage medium (25) including a calibration curve preparation program 30 showing the relation between colors and geological ages, an age arithmetic program (27) for calculating the geological ages from colors, a basic program (28), a spectro luminous intensity integration program (35), a control program (36), a compensation memory program (38), a color arithmetic program (39) and a color display system conversion program (40).

3. A geological age measurement apparatus by the color measurement of zirconium, comprising:
- an objective lens (43) attached with a polarizing plate (44) for obtaining magnified images of samples;
- a slit device (4) for stopping the quantity of light;
- a lens-barrel (6) including an optical path switching lever (7) and an eyepiece (5);
- a photoelectric transducer device (8) for converting light into electric signals;
- said objective lens (43), said slit device (4) said lens-barrel (6) and said photoelectric transducer device (8) being arranged in order from the bottom direction to the top direction above an object sample bearer (2) for placing object samples;
- a light source (12) placed in the inclined under direction from said object sample bearer (2), connected to a voltage stabilizer (14) and equipped with a polarizing plate (42) and a condenser lens (41);
- a color measuring instrument (15) for converting the electric signals converted by said photoelectric transducer device (8) into their color values, and including an input/output control unit 16, to which a compensation circuit (17), a color arithmetic circuit (19) and a color display system conversion circuit (20) are connected in series, and a compensation memory circuit (18) connected to said compensation circuit (17); and
- an arithmetic recording computer (22) connected to the output portion of said color measuring instrument (15), a display unit (31) and an input unit (29), and including both a control arithmetic circuit (34) connected to a storage medium input/output unit (24) and said storage medium input/output unit (24) connected to both a measured result storage medium (26) and a control storage medium (25) including a calibration curve preparation program (30) showing the relation between colors and geological ages, an age arithmetic program (27) for calculating the geological ages from colors and a basic program (28).

* * * * *